(12) United States Patent
Studerus et al.

(10) Patent No.: US 11,301,651 B2
(45) Date of Patent: Apr. 12, 2022

(54) METHOD AND DEVICE FOR DATA TRANSFER BETWEEN A MOBILE DEVICE AND A READER DEVICE

(71) Applicant: dormakaba Schweiz AG, Rümlang (CH)

(72) Inventors: Paul Studerus, Oberweningen (CH); Marcel Plüss, Tann (CH)

(73) Assignee: DORMAKABA SCHWEIZ AG, Rümlang (CH)

( * ) Notice: Subject to any disclaimer, the term of this patent is extended or adjusted under 35 U.S.C. 154(b) by 0 days.

(21) Appl. No.: 17/057,604

(22) PCT Filed: May 23, 2019

(86) PCT No.: PCT/EP2019/063386
§ 371 (c)(1),
(2) Date: Nov. 20, 2020

(87) PCT Pub. No.: WO2019/224329
PCT Pub. Date: Nov. 28, 2019

(65) Prior Publication Data
US 2021/0192158 A1 Jun. 24, 2021

(30) Foreign Application Priority Data

May 24, 2018 (CH) .................... 00656/18

(51) Int. Cl.
*G06F 17/00* (2019.01)
*G06K 7/10* (2006.01)
*H04L 9/32* (2006.01)

(52) U.S. Cl.
CPC ........ *G06K 7/10366* (2013.01); *H04L 9/3247* (2013.01)

(58) Field of Classification Search
CPC .............. G06K 7/10366; H04L 9/3247; G07C 2009/00341; G07C 2009/00555; G07C 2209/63
(Continued)

(56) References Cited

U.S. PATENT DOCUMENTS

2017/0324563 A1* 11/2017 Isshiki ................. H04L 9/3247
2019/0066422 A1 2/2019 Breer et al.

FOREIGN PATENT DOCUMENTS

DE 10 2017 103222 A1 8/2017
GB 2496755 A 5/2013
(Continued)

OTHER PUBLICATIONS

International Search Report and Written Opinion of the International Searching Authority for International Application No. PCT/EP2019/063386, dated Aug. 12, 2019, in 16 pages.

*Primary Examiner* — Jamara A Franklin
(74) *Attorney, Agent, or Firm* — Knobbe, Martens, Olson & Bear, LLP

(57) ABSTRACT

Method, device and system for data transfer between a mobile device (3) and a reader device (2), the method of data transfer comprising: transmitting (S3) a request value from an ultra-wideband communications module (1) to the reader device (2); determining (S4) a distance between the ultra-wideband communications module (1) and the reader device (2); generating (S5) a validation value in the reader device using the request value and transmitting (S6) the validation value from the reader device (2) to the mobile device (3), if the distance is smaller than a predefined value; verifying (S7), in the mobile device (3), the validation value; and enabling (S8), in the mobile device (3), further data transfer (S9) between the mobile device (3) and the reader device (2), upon affirmative verifying of the validation value.

15 Claims, 8 Drawing Sheets

(58) Field of Classification Search
USPC .................................... 235/375, 380, 451
See application file for complete search history.

(56) References Cited

FOREIGN PATENT DOCUMENTS

| | | |
|---|---|---|
| WO | WO 2014/064296 A1 | 5/2014 |
| WO | WO 2017/136725 A1 | 8/2017 |

* cited by examiner

METHOD AND DEVICE FOR DATA TRANSFER BETWEEN A MOBILE DEVICE AND A READER DEVICE

CROSS-REFERENCE TO RELATED APPLICATIONS

This application is the U.S. National Phase under 35 U.S.C. § 371 of International Application PCT/EP2019/063386, filed May 23, 2019, which claims priority to CH Application No. 00656/18, filed May 24, 2018, the entire contents of each of which are incorporated by reference herein and made a part of this specification.

FIELD OF THE INVENTION

The present invention relates to a method and device for data transfer between a mobile device and a reader device. Specifically, the present invention relates to a method, a reader device, and a mobile system for data transfer between the mobile device and the reader device.

BACKGROUND OF THE INVENTION

Keyless entry systems have become widely used in applications ranging from vehicle entry systems and vehicle access control systems to building access control. For very close-range applications, a radio-frequency identification (RFID) transponder (or tag) is often used, which has mostly replaced earlier magnetic stripe cards. Other current solutions use infrared systems or radio systems to transmit an authenticating signal from a user device to a vehicle security system or to a building access device. The authenticating can be initiated either by the user, for instance by pressing a button on the user device, or from the access device itself which periodically transmits request signals and awaits a response message.

These current systems involve specific devices for each type of access point, such that users are often required to carry several user devices to access their vehicle, their workplace building, their gym and other such access controlled areas. This makes the existing solutions of devices and systems inefficient and not very user friendly.

As the communicating range between a user device and an access device increases, the convenience and ease-of-use increases, because the user device does not need to be placed in very close range, such as less than one centimeter. However as the range increases, potential new security issues also arise. This is because, if there are several transponders in the vicinity of a reader device, in a situation such as a queue, it can become unclear if is indeed the person at the front of the queue who has the necessary authorization when another authorized user is also within range. Approaches have been introduced to reduce the chance of granting entry to an unauthorized third party. In one approach the chosen frequency can limit the range, for example 13.56 MHz High Frequency (HF) has a typical read range of between 1 cm and 1 m. Another approach involves using a technology with a higher range and then evaluating the distance between the reader device and the transponder based on the signal path loss of the received signal. This does not allow a very precise distance measurement because of signal loss and interference due to surfaces, absorption due to air humidity, anisotropic antenna responses, and imprecisely calibrated devices.

The maximum allowable distance for authorizing access may be location specific, i.e. for a vehicle access system it might be larger than for an entry-way access system. However, relatively simple relay attacks using signal repeaters or amplifiers can fool the system into granting access, even when the user device and the access device are far apart. This has enabled unauthorized access and has left users and providers of access control devices with a need for higher security methods.

WO 2017/155348 A1 describes a mobile device for adapting mobile, portable communications devices to security systems, in particular for the key-less activation of an entry system for vehicles, wherein a modular unit is configured such that a communication between the mobile device and the security system is possible.

WO 2017/17121452 A1 describes a method for distance measurement based on a time difference between a challenge and a response message, wherein the challenge and response messages are transmitted by a transmission protocol in which the corresponding message is transmitted by a transformed spreading code.

SUMMARY OF THE INVENTION

It is an object of this invention to provide a method and device for data transfer between a mobile device and a reader device. In particular, it is an object of the present invention to provide a method and devices for the efficient and secure data transfer between a mobile device and a reader device.

According to the present invention, these objects are achieved through the features of the independent claims. In addition, further advantageous embodiments follow from the dependent claims.

According to the present invention, the above-mentioned objects are particularly achieved in a method of data transfer between a mobile device and a reader device, comprising transmitting, via an ultra-wideband transmission, from an ultra-wideband communications module to the reader device, a request value. The method further comprises determining, by the reader device, a distance between the ultra-wideband communications module and the reader device based on transmission properties of the ultra-wideband transmission. The method further comprises generating, by the reader device, a validation value, using the request value from the ultra-wideband communications module, and transmitting the validation value, via a wireless transmission, from the reader device to the mobile device, if the distance between the ultra-wideband module and the reader device is smaller than a predefined value. The method further comprises verifying, in the mobile device, the validation value using the request value. The method further comprises enabling, in the mobile device, further data transfer between the mobile device and the reader device, upon affirmative verifying of the validation value.

Ultra-wideband (UWB) is a communications technology which uses radio waves for short-range, high-bandwidth communications over a large portion of the radio spectrum. Information is transmitted by generating radio wave pulses at specific time intervals, as opposed to conventional radio systems which transmit information by varying a power level of the radio transmission, or modulating a frequency and/or phase of the transmission. Information can also be modulated on ultra-wideband signals by varying an amplitude, encoding a polarity, or using orthogonal pulses.

In an embodiment the method further comprises transmitting the request value, via a wired or wireless transmission, from the ultra-wideband communications module to the mobile device or vice versa.

In another embodiment of the method, transmitting the request value further comprises determining a distance between the ultra-wideband communications module and the mobile device.

In another embodiment the method further comprises using two or more antennas to determine two or more distances between the ultra-wideband communications module and one of the two or more antennas, respectively. The method further comprises determining whether the ultra-wideband communications module is outside an access controlled area or inside the access controlled area using the two or more distances. The method further comprises generating the validation value only if the ultra-wideband communications module is outside the access controlled area.

In another embodiment of the method, determining a distance uses transmission properties including a time difference, an amplitude difference, and/or a phase difference of the ultra-wideband transmission.

In another embodiment of the method, the request value and the validation value are digitally signed, and verifying the validation value further comprises authenticating the digitally signed request value and the digitally signed validation value by verifying their digital signatures.

In another embodiment of the method, transmitting the validation value from the reader device to the mobile device comprises an ultra-wideband transmission from the reader device to the ultra-wideband communications module and a wired or wireless transmission from the ultra-wideband communications module to the mobile device, and further data transfer between the mobile device and the reader device comprises a wired or wireless transmission between the mobile device and the ultra-wideband communications module, and an ultra-wideband transmission between the ultra-wideband communications module and the reader device.

In addition to the method of data transfer between a mobile device and a reader device, the present invention also relates to a reader device for data transfer with a mobile device, comprising an ultra-wideband transceiver configured to receive, via an ultra-wideband transmission from an ultra-wideband communications module, a request value. The device further comprises a processor configured to determine a distance between the ultra-wideband communications module and the reader device based on transmission properties of the ultra-wideband transmission, and to generate a validation value, if the distance between the ultra-wideband communications module and the reader device is smaller than a predefined value. The device further comprises a wireless communications module configured to transmit the validation value to the mobile device, via a wireless transmission, enabling the mobile device to verify the validation value using the request value from the ultra-wideband communications module, prior to enabling further data transfer between the reader device and the mobile device, via wireless transmission.

In an embodiment the ultra-wideband transceiver further comprises two or more antennas. The processor is further configured to determine two or more distances between the ultra-wideband communications module and one of the antennas, respectively, based on transmission properties of the ultra-wideband transmission. The processor is further configured to determine whether the ultra-wideband communications module is outside an access controlled area or inside an access controlled area, using the two or more distances. The processor is further configured to generate a validation value, if the ultra-wideband communications module is outside the access controlled area.

In an embodiment, the processor is configured to determine a distance using transmission properties including a time difference, an amplitude difference, and/or a phase difference of the ultra-wideband transmission.

In another embodiment, the processor is configured to receive a digitally signed request value and to transmit a digitally signed validation value.

In another embodiment, the wireless communications module is configured for wireless transmission using Bluetooth (BT), Bluetooth Low Energy (BLE), a Wireless Local Area Network (WLAN), Zig Bee, Radio Frequency Identification (RFID), Z-Wave, and/or Near Field Communication (NFC).

In another embodiment, the ultra-wideband transceiver is further configured to transmit the validation value to the mobile device, via an ultra-wideband transmission from the ultra-wideband transceiver to the ultra-wideband communications module and a wired or wireless transmission from the ultra-wideband communications module to the mobile device, and wherein the wireless communications module is further configured to enable further data transfer between the reader device and the mobile device, via a transmission between the mobile device and an ultra-wideband communications module and an ultra-wideband transmission between the ultra-wideband communications module and the reader device.

In addition to a method and device of data transfer between a mobile device and a reader device, the present invention also relates to a mobile system for data transfer with a reader device, comprising an ultra-wideband communications module configured to transmit, via an ultra-wideband transmission, a request value to a reader device, enabling the reader device to determine a distance between the ultra-wideband communications module and the reader device based on transmission properties of the ultra-wideband transmission. The system further comprises a wireless communications module configured to receive, via a wireless transmission, a validation value from the reader device, transmitted by the reader device, if the distance between the ultra-wideband module and the reader device is smaller than a predefined value. The system further comprises a processor configured to verify the validation value using the request value, and upon affirmative verification of the validation value, to enable data transfer with the reader device.

In an embodiment, the ultra-wideband communications module is further configured to receive the validation value, via an ultra-wideband transmission from the reader device to the mobile system, and wherein the processor is further configured to enable data transfer between the mobile system and the reader device via an ultra-wideband transmission.

BRIEF DESCRIPTION OF THE DRAWINGS

The present invention will be explained in more detail, by way of example, with reference to the drawings in which.

DESCRIPTION OF THE EMBODIMENTS

Figure 1:
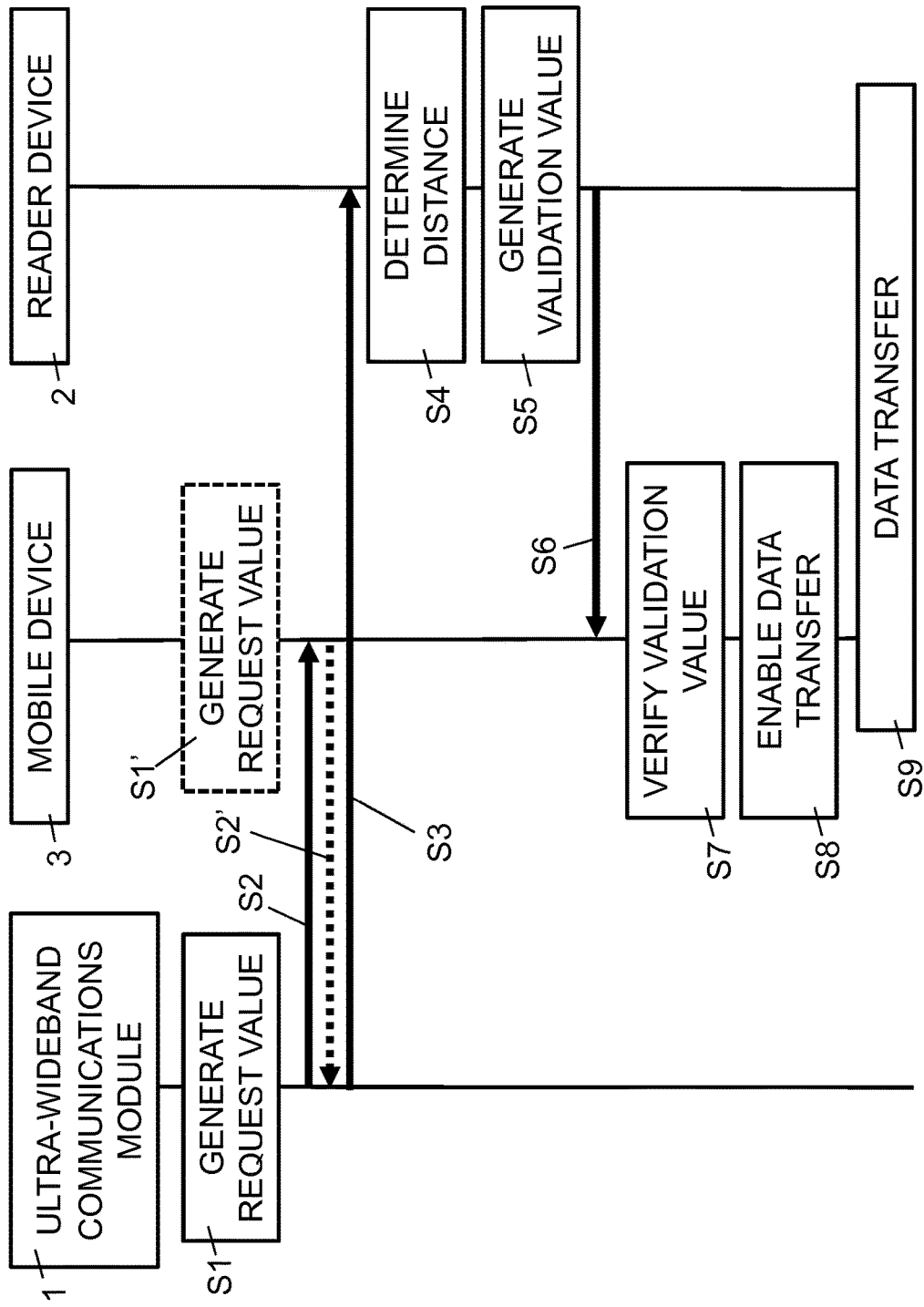
FIG. 1 shows a flow diagram illustrating an exemplary sequence of steps for data transfer between a mobile device and a reader device.

Whenever possible, like reference numbers will be used to refer to like components or parts.

In FIGS. 1 to 5, reference numeral 3 refers to a mobile device. The mobile device 3 is a portable electronic system such as a smart phone, smart watch, tablet, laptop, or similar device. The mobile device 3 contains a processor 31 and a wireless communication module 32. The wireless communications module 32 is configured for wireless transmission using Bluetooth (BT), Bluetooth Low Energy (BLE), a Wireless Local Area Network (WLAN), ZigBee, Radio Frequency Identification (RFID), Z-Wave, and/or Near Field Communication (NFC). The mobile device 3 also contains provisions for wired communication via a socket such as USB, Micro-USB, USB-C, Lightning, or 3.5 mm jack, for use in a wired communication using an appropriate protocol for wired transmission.

In FIGS. 1 to 8, reference numeral 2 refers to a reader device. The reader device 2 may be fixedly mounted near an access point or specially designated area, such as on a wall or ceiling or in a door itself, or mounted onto a movable item such as a bicycle or vehicle. The reader device comprises an ultra-wideband transceiver 21, a processor 22, and a wireless communications module 23.

In FIGS. 1 to 8, reference numeral 1 refers to an ultra-wideband communications module. The ultra-wideband communications module 1 is a hardware device which is either a standalone device not integrated into another device, or a module which is incorporated into a device. The ultra-wideband communications module 1 is comprised of an ultra-wideband transceiver 11, and if embodied in a standalone device further comprises means of communicating with a mobile device, such means including: a wireless communications module 12, a cable for wired transmission, and/or a plug for establishing a pluggable connection with a suitable socket on the mobile device 3. If the ultra-wideband communications module 1 is integrated into a mobile device 3, communication with other hardware modules of the mobile device 3 takes place via a wired data bus. The ultra-wideband communications module 1 may be carried on a user, for example on a keychain, in a pocket of apparel, or in a bag, such that the user may be identified on the basis of their possession of the ultra-wideband communications module 1. In an embodiment, the ultra-wideband communications module 1 further comprises a signal strength detector for determining a signal strength of a wireless transmission, to establish on the basis of the received signal strength a proximity to the mobile device 3.

Figure 5:
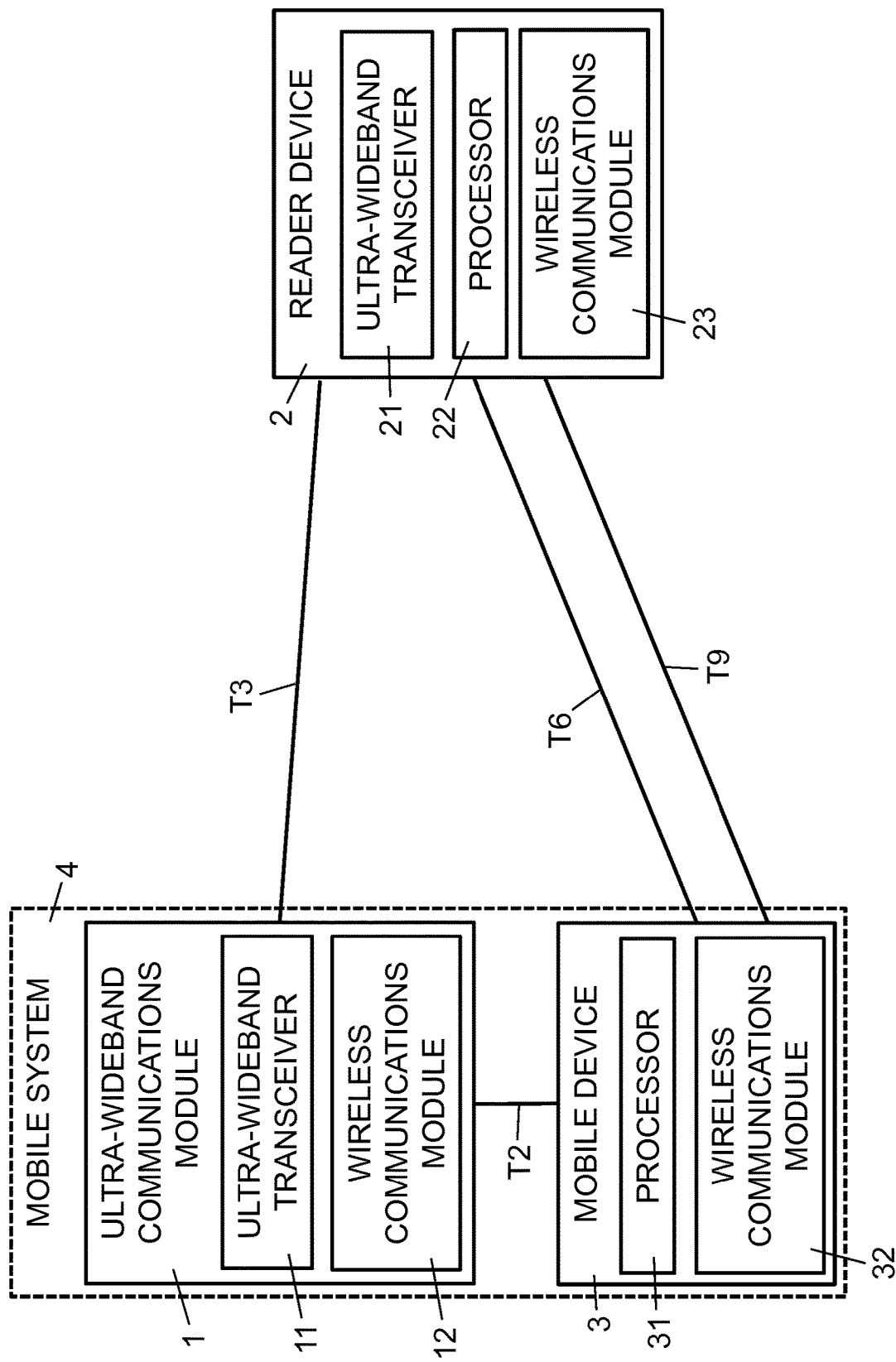
FIG. 5 shows a block diagram illustrating schematically a data flow in a system for data transfer between a mobile device and a reader device, wherein the mobile system comprises a separate ultra-wideband communications module and mobile device.
Figure 6:
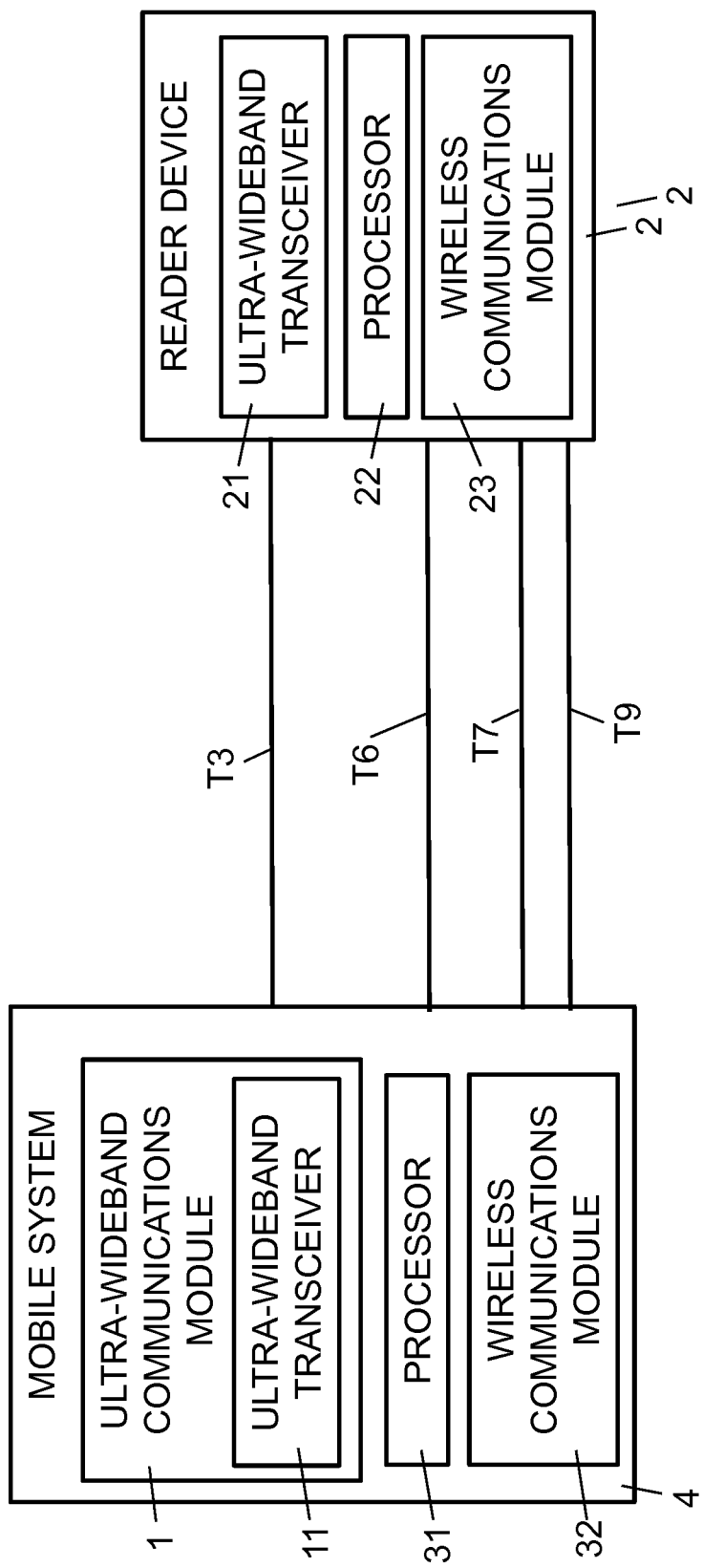
FIG. 6 shows a block diagram illustrating schematically a data flow in a system for data transfer between a mobile device and a reader device, wherein the mobile system comprises a mobile device with an integrated ultra-wideband communications module.

In FIGS. 5 and 6, reference numeral 4 refers to a mobile system. The mobile system 4 comprises the mobile device 3 and the ultra-wideband communications module 1. In an embodiment the mobile device 3 and the ultra-wideband communications module 1 are integrated into the same device, as outlined in FIG. 6. In another embodiment the mobile device 3 and the ultra-wideband communications module 1 are separate devices in proximity to each other, as outlined in FIG. 5. In an embodiment where the ultra-wideband communications module 1 and the mobile system 4 are integrated into the same device, the communication between the mobile system 4 and the reader device 2 takes place via an ultra-wideband transmission T7 or another wireless transmission, as described above.

As shown in FIG. 1, in step S1, the ultra-wideband module 1 generates a request value. Subsequently, in step S2, the ultra-wideband communications module 1 transmits the request value to the mobile device 3. Alternatively, a request value is generated in the mobile device 3, as shown in step S1'. In the latter scenario, in step S2', the mobile device 3 subsequently transmits the request value to the ultra-wideband communications module 1. In both scenarios, the request value is generated from: cryptographic keys, hardware information, serial numbers, user credentials, user access rights, and/or time-stamps. The transmission of the request value, in steps S2 or S2', takes place via a wireless or a wired transmission T2, T2', respectively.

In case of a wireless transmission, in an embodiment, the receiver of the transmission determines a distance using a received signal strength. The determined distance is compared to a predefined value to establish whether the ultra-wideband communications module 1 and the mobile device 3 are within a predefined distance. The specific predefined value will depend on a use-case. For example, in the use-case of a user in an access control scenario, the predefined value indicates a relatively short distance, e.g. in a range of 50-100 centimeters, such that it allows a determination of whether the ultra-wideband communications module and the mobile device 3 are being carried by the same user. In the use-case of a vehicle in a parking garage access control scenario where the ultra-wideband communications module is integrated in the vehicle the predefined value indicates a greater distance, e.g. 3-10 meters, such that it allows a determination of whether the user is situated inside, or close to, the vehicle.

A wired transmission T2 or T2' is implemented via a cable, a direct pluggable connection, or via a data bus if the ultra-wideband communications module 1 and the mobile device 3 comprise a single device. In this wired scenario there is no need to determine a distance between the devices 1 and 3.

As illustrated in FIG. 1, in step S3, the request value is transmitted from the ultra-wideband communications module 1 to the reader device 2 in an ultra-wideband transmission. The distance is determined in the reader device, in step S4, based on transmission properties of the ultra-wideband transmission T3. The transmission properties include a time difference, an amplitude difference, and/or a phase difference. The amplitude difference is the difference in signal amplitude between the signal transmitted by the ultra-wideband communications module 1 and the signal received by the reader device 2. By taking into consideration the attenuation of the signal, the distance between the ultra-wideband communications module 1 and the reader device 2 is determined.

The phase difference is the difference in signal phase between the signal transmitted by the ultra-wideband communications module 1 and the signal received by the reader device 2. By taking into consideration the change in signal phase, the distance between the ultra-wideband communications module 1 and the reader device 2 is determined. It is to be understood that for the amplitude difference and phase difference, alternatively, the signal may also be transmitted by the reader device 2 and received by the ultra-wideband communications device 1. In a preferred embodiment, a time difference is used as a basis for determining the distance, as it is more secure against spoofing attacks, wherein a third party may use a radio relay device to gain unauthorized access to a location or system in a so-called "relay-attack". Depending on the embodiment, the time difference is a "one-way time-of-flight" time difference between the ultra-wideband communications module 1 sending the request value and the reader device 2 receiving the request value, or a "round-trip time-of-flight" time difference, in which a second transmission takes place from the reader device 2 to the ultra-wideband communications module 1 either prior to, or after, the first transmission of the request value. In the "one-way time-of-flight" scenario, the ultra-wide-band communications module 1 and the reader device 2 are provided with tightly synchronized clocks for accurately determining the distance. In the latter case of a "round-trip time-of-flight" calculation, there is stored, either in the reader device 2 or the ultra-wideband communications module 1, an accurate representation of the processing time, i.e. the time it takes between the reception of an ultra-wideband transmission and the sending of a response ultra-wideband transmission, which processing time allows for accurately determining the distance.

In step S5, the reader device 2 generates a validation value, if the determined distance is smaller than a predefined value. The predefined value may be set during manufacture or during commissioning of the access system and adjusted or updated as necessary. In step S6, the validation value is then transmitted to the mobile device 3 via a wireless transmission T6, using one of the wireless technologies mentioned above. The mobile device 3 then verifies the validation value, using the request value in step S7. If the validation value is affirmatively verified, the mobile device 3 enables data transfer in step S8. In step S9, data transfer between the mobile device 3 and the reader device 2 takes place. This data transfer may comprise sending and/or receiving user credentials, access credentials, location information, codes, passwords, and/or other data. In an access control scenario, this data transfer makes it possible to control and allow a user to gain access to a restricted access area or space or to gain authorization on further devices, appliances, and/or systems.

Figure 2:
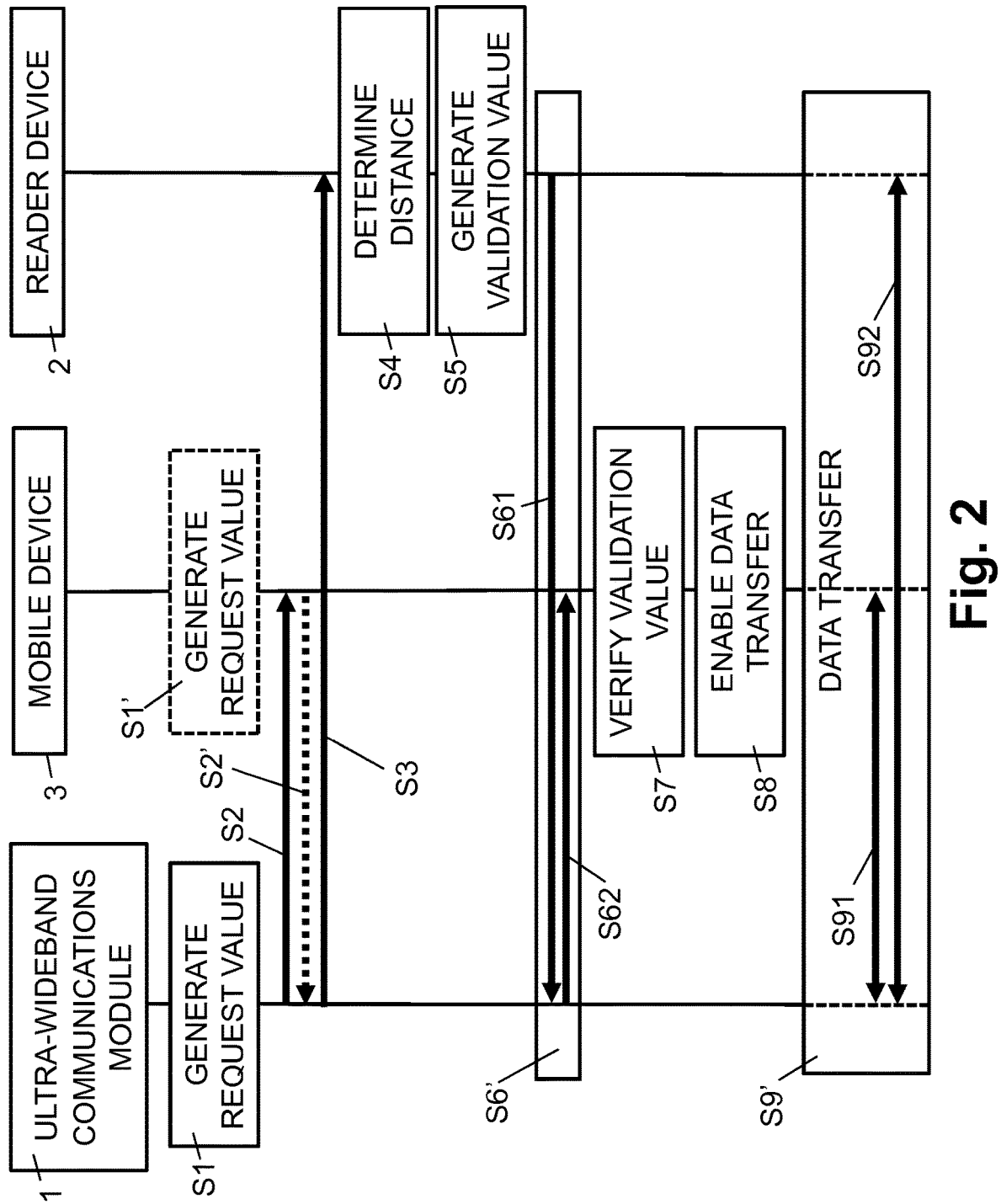
FIG. 2 shows a flow diagram illustrating an exemplary sequence of steps for data transfer between a mobile device and a reader device.

In FIG. 2, the sequence for data transfer between the mobile device 3 and the reader device 2 differs from the sequence of FIG. 1 in that steps S6 and S9 are replaced by steps S6' and S9', respectively. In step S6' the validation value is transmitted from the reader device 2 to the mobile device 3 in two sub-steps. In a first sub-step S61, the validation value is transmitted from the reader device 2 to the ultra-wideband communications module 1 via an ultra-wideband transmission T61. In a second sub-step S62, the validation value is transmitted from the ultra-wideband communications module 1 to the mobile device 3 via a wireless transmission T62. Similarly, in step S9', the data transfer between the mobile device 3 and the reader device 2 takes place via the ultra-wideband communications module 1. In a first sub-step S91, data transfer between the mobile device 3 and the ultra-wideband communications module 1 occurs in a first transmission T91, and in a second sub-step S92, data transfer between the ultra-wideband communications module 1 and the reader device 2 occurs in a second transmission T92. This embodiment has the advantage that the reader device 2 does not require a wireless communications module 23.

Figure 3:
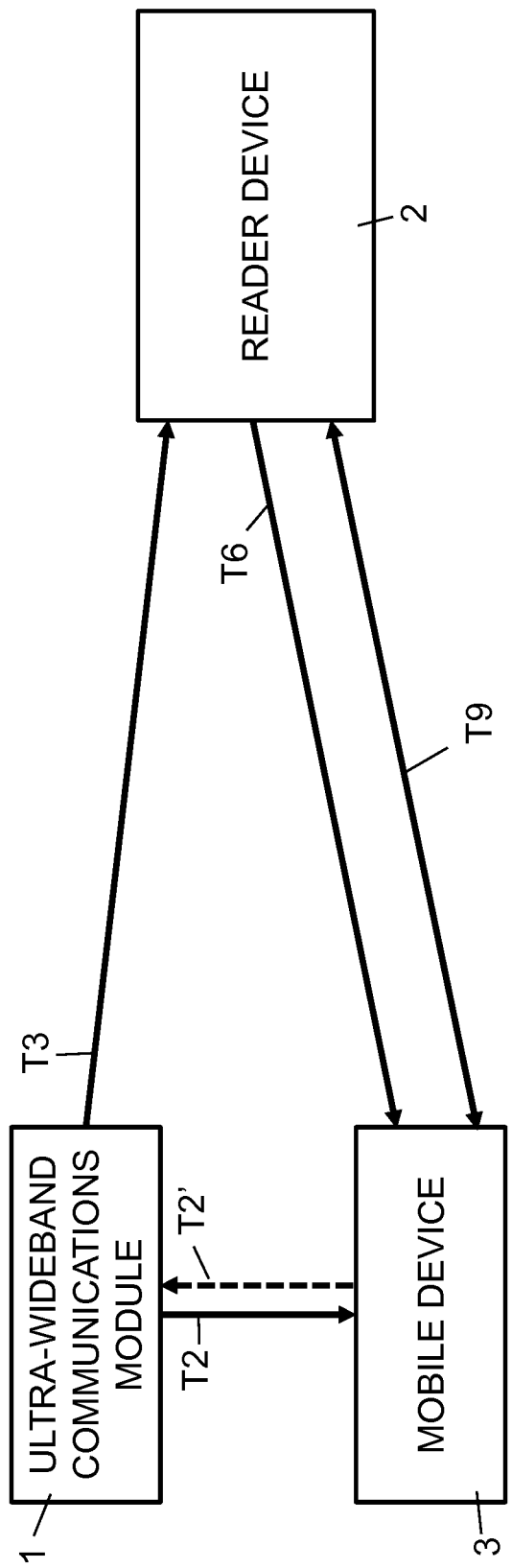
FIG. 3 shows a block diagram illustrating schematically a data flow in a system for data transfer between a mobile device and a reader device.

FIG. 3 illustrates the data transmissions between the ultra-wideband communications module 1, the reader device 2, and the mobile device 3. The request value is transmitted from the ultra-wideband communications module 1 to the mobile device 3, in transmission T2. In an alternate embodiment, the request value is instead transmitted from the mobile device 3 to the ultra-wideband communications module 1, in transmission T2'. The request value is transmitted from the ultra-wideband communications module 1 to the reader device 2, in transmission T3. The reader device 2 determines the distance between the ultra-wideband communications module 1 and the reader device 2, as described above. If the distance is smaller than a predefined value, the reader device 2 transmits a validation value to the mobile device 3, in a transmission T6. The mobile device 3 then verifies the validation value using the request value as described above, and upon affirmative verification enables data transfer in transmission T9, between the mobile device 3 and the reader device 2.

Figure 4:
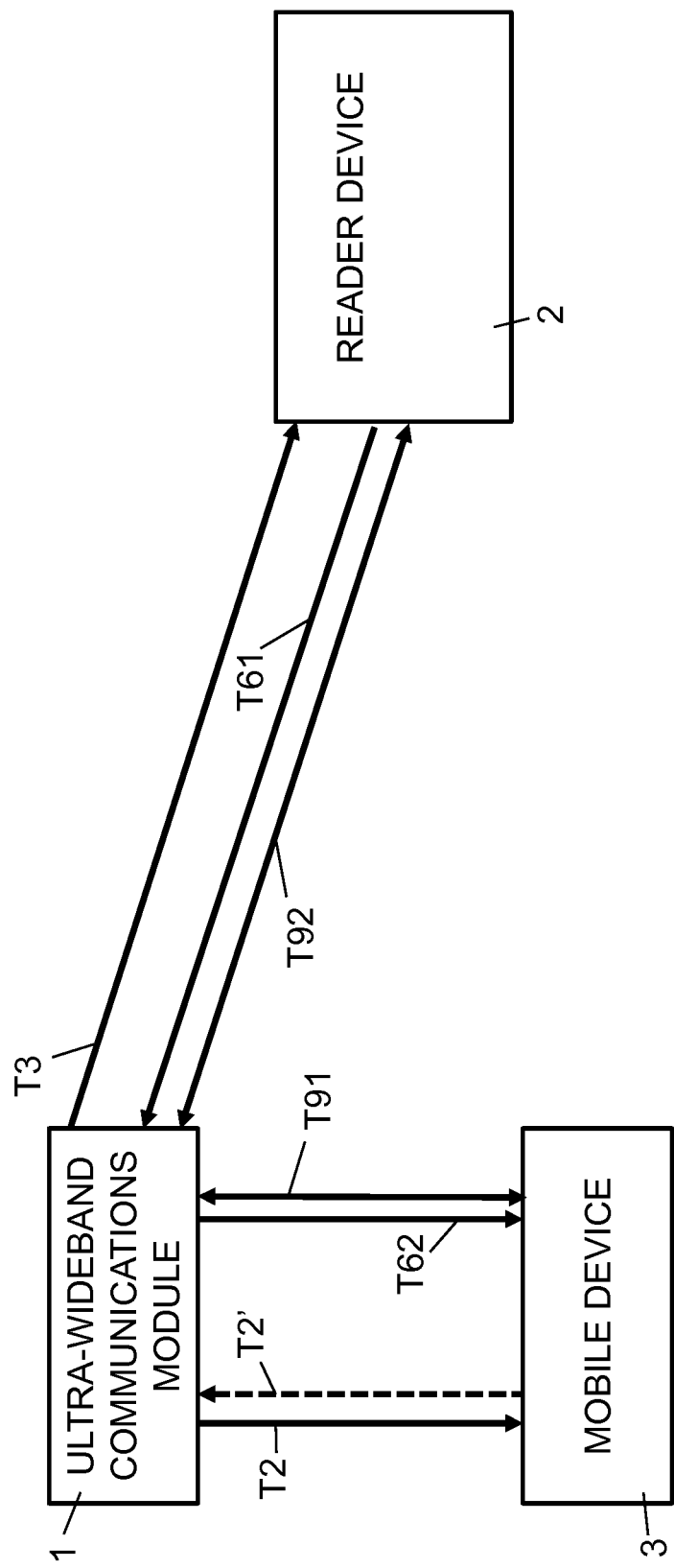
FIG. 4 shows a block diagram illustrating schematically a data flow in a system for data transfer between a mobile device and a reader device.

In FIG. 4, the data transmissions between the ultra-wideband communications module 1, the reader device 2, and the mobile device 3 differ from FIG. 3 in that transmissions T6 and T9 are replaced by the transmissions T61, T62, and T91, T91, respectively. In this embodiment, the transmission of the validation value between the mobile device 3 and the reader device 2 takes place between the mobile device 3 and the ultra-wideband communications module 1, in a first transmission T61, and between the ultra-wideband communications module 1 and the reader device 2, in a second transmission T62. Similarly the data transfer between the mobile device 3 and the reader device 2 takes place between the mobile device 3 and the ultra-wideband communications module 1, in a first transmission T91, and between the ultra-wideband communications module 1 and the reader device 2, in a second transmission T92.

Figure 7:
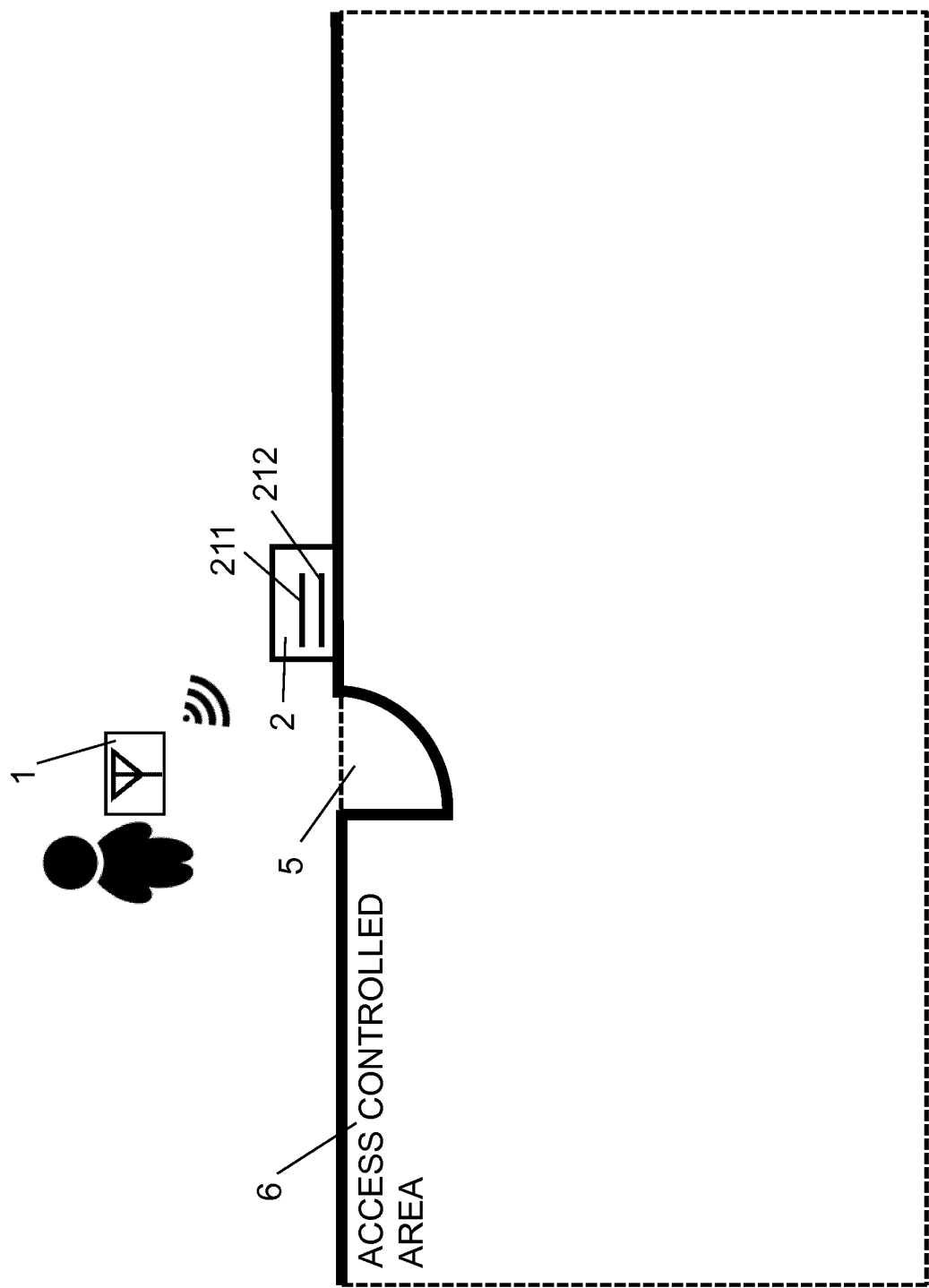
FIG. 7 shows a diagram illustrating schematically a person with an ultra-wideband communications module situated, a reader device, and an access controlled area.

In FIG. 7, a person possessing an ultra-wideband communications module 1 is situated outside an access controlled area 6. A reader device 2 is installed close to the doorway 5. In this embodiment the reader device 2 comprises two antennas 211 and 212. The ultra-wideband communications module 1 transmits a request value in a transmission T3 which is received by both antennas 211 and 212. The reader device 2 determines two distances between the ultra-wideband communications module 1 and the antennas 211 and 212, respectively, as described above. The reader device determines whether one or both of the distances is smaller than a predefined value, as described above. The reader device 2 also determines a difference in the two determined distances between antenna 212 and the ultra-wideband communications module 1, and antenna 211 and the ultra-wideband communications module 1. The difference is used to determine whether the ultra-wideband communications module 1, and therefore by extension the person possessing the ultra-wideband communications module 1, is inside or outside the access controlled area 6. If the person is inside the access controlled area 6 it is advantageous that the reader device 2 not generate a validation value as it may inadvertently lead to unauthorized access of the access controlled area 6 by other persons. In this embodiment, if the difference is positive, the ultra-wideband communications module 1 is outside the access controlled area 6. If the difference is negative, the ultra-wideband communications module 1 is inside the access controlled area 6. If one or both of the determined distances is smaller than a predefined value and the ultra-wideband communications module 1 is outside the access controlled area 6, the reader device 2 generates a validation value and proceeds as described above.

In further embodiments, arrangements involving three or more antennas can be used for the purposes of higher precision or for determining a spatial position of the ultra-wideband communications module 1. The spatial position of the ultra-wideband communications module 1 is further used to decide whether or not the reader device 2 generates a validation value and proceeds as described above. For example, in combination with further information about the access controlled area and its surroundings, e.g. a floor plan of a building such as a hotel or the like, the spatial position is used to distinguish between positions of the ultra-wideband communications module 1 which are relevant for the reader device 2 to control access, e.g. outside the access controlled area 6 but in front of a door to the accessed controlled area 6, or which are not relevant of for the reader device 2 to control access, e.g. outside the access controlled area 6 but in another room without open access to the door of the accessed controlled area 6.

Figure 8:
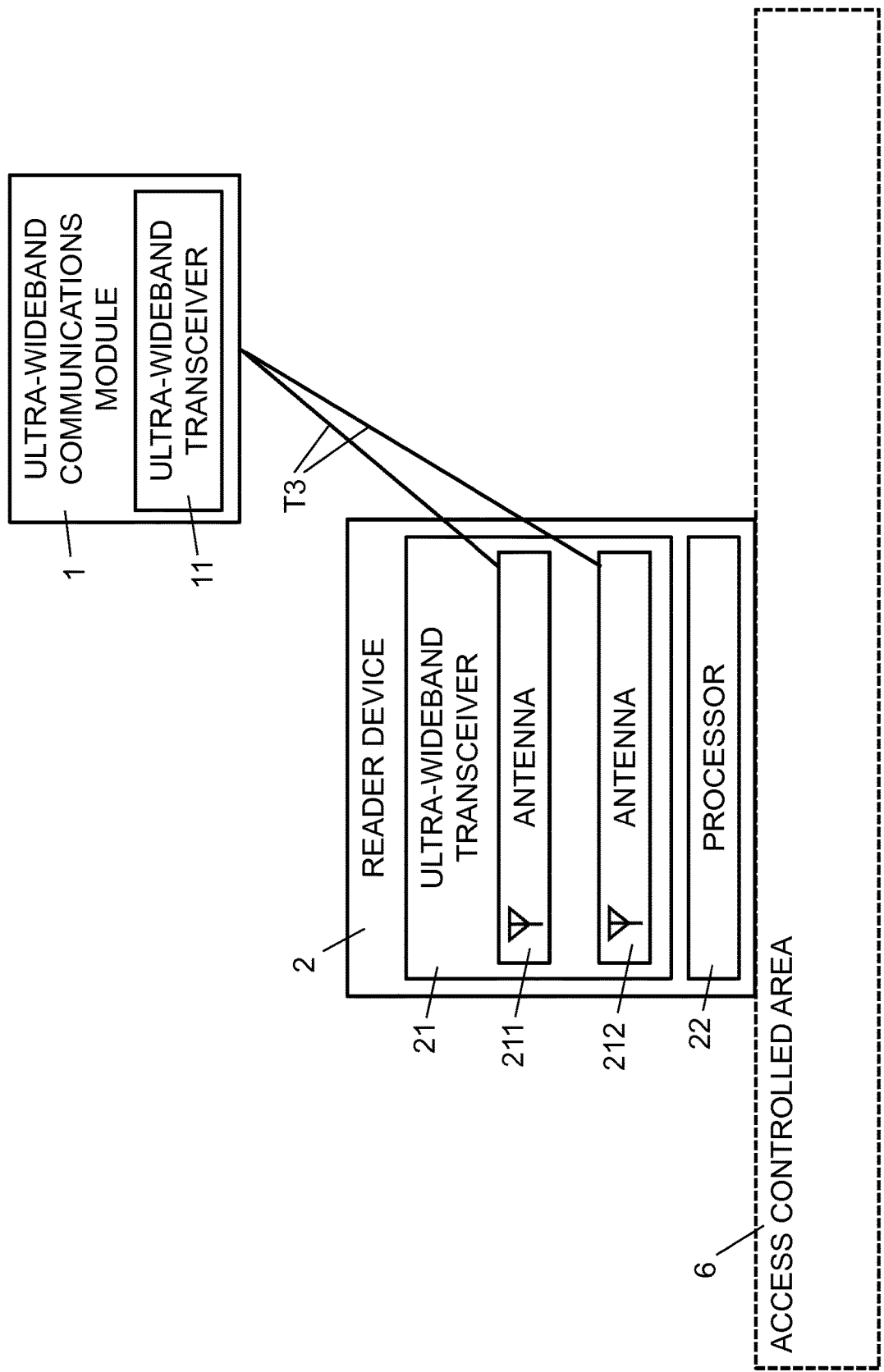
FIG. 8 shows a block diagram illustrating schematically a reader device with two antennas, an ultra-wideband communications module, and an access controlled area.

In FIG. 8, a reader device 2 is shown schematically comprising an ultra-wideband transceiver 21 and a processor 22. The ultra-wideband transceiver 21 further comprises two antennas 211 and 212. The antennas are arranged such that one antenna 212 is between the access controlled area 6 and the other antenna 211. The distance between the antennas 211 and 212 must be large enough that a precise difference may be determined, as required by desired decision criteria. An ultra-wideband communications module 1 comprises an ultra-wideband transceiver 11 which transmits a request value in a transmission T3 which is received by both antennas 211 and 212. The reader device is located next to an access controlled area 6.

It should be noted that, in the description, the sequence of the steps has been presented in a specific order, one skilled in the art will understand, however, that the order of at least some of the steps could be altered, without deviating from the scope of the invention.

LIST OF REFERENCE NUMERALS

1 Ultra-wideband communications module
2 Reader device
3 Mobile device
4 Mobile system
5 Doorway
6 Access controlled area
11 Ultra-wideband transceiver
12 Wireless communications module
21 Ultra-wideband transceiver
211 Antenna
212 Antenna
22 Processor
23 Wireless communications module
31 Processor
32 Wireless communications module
S1, S1' Generate request value
S2, S2' Transmit request value
S3 Transmit request value
S4 Determine distance
S5 Generate validation value
S6, S6' Transmit validation value
S61 Validation value transfer between the mobile device and the ultra-wideband communications module
S62 Validation value transfer between the ultra-wideband communications module and the reader device
S7 Verifying a validation value
S8 Enabling data transfer
S9, S9' Data transfer between the mobile device and the reader device
S91 Data transfer between the mobile device and the ultra-wideband communications module
S92 Data transfer between the ultra-wideband communications module and the reader device
T2, T2' Transmission of request value
T3 Transmission of request value
T6, T6' Transmission of validation value
T61 Transmission of validation value
T62 Transmission of validation value
T7 Transmission of validation value
T9, T9' Data transfer
T91 Data transfer
T92 Data transfer

What is claimed is:

1. Method of data transfer between a mobile device and a reader device, comprising the following steps:

transmitting, via an ultra-wideband transmission, from an ultra-wideband communications module to the reader device, a request value;

determining, by the reader device, a distance between the ultra-wideband communications module and the reader device based on transmission properties of the ultra-wideband transmission;

generating, by the reader device, a validation value, using the request value from the ultra-wideband communications module, and transmitting the validation value, via a wireless transmission, from the reader device to the mobile device, if the distance between the ultra-wideband module and the reader device is smaller than a predefined value;

verifying, in the mobile device, the validation value using the request value; and enabling, in the mobile device, further data transfer between the mobile device and the reader device, upon affirmative verifying of the validation value.

2. The method of claim 1, wherein the method further comprises transmitting the request value, via a wired or wireless transmission, from the ultra-wideband communications module to the mobile device or vice versa.

3. The method of claim 2, wherein transmitting the request value further comprises determining a distance between the ultra-wideband communications module and the mobile device.

4. The method of claim 1, further comprising using two or more antennas to determine two or more distances between the ultra-wideband communications module and one of the two or more antennas, respectively; determining whether the ultra-wideband communications module is outside an access controlled area or inside the access controlled area, using the two or more distances; and generating the validation value only if the ultra-wideband communications module is outside the access controlled area.

5. The method of claim 1, wherein determining a distance uses transmission properties including at least one of: a time difference, an amplitude difference, and a phase difference of the ultra-wideband transmission.

6. The method of claim 1, wherein the request value and the validation value are digitally signed, and wherein verifying the validation value further comprises authenticating the digitally signed request value and the digitally signed validation value by verifying the digital signatures of the request value and the validation value.

7. The method of claim 1, wherein transmitting the validation value from the reader device to the mobile device comprises an ultra-wideband transmission from the reader device to the ultra-wideband communications module and a wired or wireless transmission from the ultra-wideband communications module to the mobile device, and wherein further data transfer between the mobile device and the reader device comprises a wired or wireless transmission between the mobile device and the ultra-wideband communications module, and an ultra-wideband transmission between the ultra-wideband communications module and the reader device.

8. A reader device for data transfer with a mobile device, comprising:
an ultra-wideband transceiver, configured to receive, via an ultra-wideband transmission from an ultra-wideband communications module, a request value;
a processor configured to determine a distance between the ultra-wideband communications module and the reader device based on transmission properties of the ultra-wideband transmission, and to generate a validation value, if the distance between the ultra-wideband communications module and the reader device is smaller than a predefined value; and
a wireless communications module configured to transmit the validation value to the mobile device, via a wireless transmission, enabling the mobile device to verify the validation value using the request value from the ultra-wideband communications module, prior to enabling further data transfer between the reader device and the mobile device, via wireless transmission.

9. The device of claim 8, wherein the ultra-wideband transceiver comprises two or more antennas; and the processor is configured to determine two or more distances, between the ultra-wideband communications module and one of the antennas, respectively, based on transmission properties of the ultra-wideband transmission, to determine whether the ultra-wideband communications module is outside an access controlled area or inside an access controlled area, using the two or more distances, and to generate a validation value, if the ultra-wideband communications module is outside the access controlled area.

10. The device of claim 8, wherein the processor is configured to determine a distance using transmission properties including at least one of: a time difference, an amplitude difference, and a phase difference of the ultra-wideband transmission.

11. The device of claim 8, wherein the processor is configured to receive a digitally signed request value and to transmit a digitally signed validation value.

12. The device of claim 8, wherein the wireless communications module is configured for wireless transmission using at least one of: Bluetooth, Bluetooth Low Energy, a Wireless Local Area Network, ZigBee, Radio Frequency Identification, Z-Wave, and Near Field Communication.

13. The device of claim 8, wherein the ultra-wideband transceiver is further configured to transmit the validation value to the mobile device, via an ultra-wideband transmission from the ultra-wideband transceiver to the ultra-wideband communications module and a wired or wireless transmission from the ultra-wideband communications module to the mobile device, and wherein the wireless communications module is further configured to enable further data transfer between the reader device and the mobile device, via a transmission between the mobile device and an ultra-wideband communications module and an ultra-wideband transmission between the ultra-wideband communications module and the reader device.

14. A mobile system for data transfer with a reader device, comprising:
an ultra-wideband communications module configured to transmit, via an ultra-wideband transmission, a request value to a reader device, enabling the reader device to determine a distance between the ultra-wideband communications module and the reader device based on transmission properties of the ultra-wideband transmission;
a wireless communications module configured to receive, via a wireless transmission, a validation value from the reader device, transmitted by the reader device, if the distance between the ultra-wideband module and the reader device is smaller than a predefined value; and
a processor configured to verify the validation value using the request value, and upon affirmative verification of the validation value, to enable data transfer with the reader device.

15. The mobile system of claim 14, wherein the ultra-wideband communications module is further configured to receive the validation value, via an ultra-wideband transmission from the reader device to the mobile system, and wherein the processor is further configured to enable data transfer between the mobile system and the reader device via an ultra-wideband transmission.

* * * * *